United States Patent
Lampinen

(12) 
(10) Patent No.: US 7,575,657 B2
(45) Date of Patent: Aug. 18, 2009

(54) METHOD AND APPARATUS FOR REDUCING THE AMOUNT OF SLUDGE PRODUCED IN A PULP AND/OR PAPER MILL

(75) Inventor: Rami Lampinen, Tampere (FI)

(73) Assignee: Metso Paper, Inc., Helsinki (FI)

( * ) Notice: Subject to any disclaimer, the term of this patent is extended or adjusted under 35 U.S.C. 154(b) by 375 days.

(21) Appl. No.: 11/568,593

(22) PCT Filed: May 3, 2005

(86) PCT No.: PCT/FI2005/050144

§ 371 (c)(1),
(2), (4) Date: Dec. 15, 2006

(87) PCT Pub. No.: WO2005/106113

PCT Pub. Date: Nov. 10, 2005

(65) Prior Publication Data

US 2007/0221346 A1    Sep. 27, 2007

(30) Foreign Application Priority Data

May 5, 2004 (FI) .................................. 20040637
Nov. 5, 2004 (FI) .................................. 20045423
Jan. 26, 2005 (FI) .................................. 20055037

(51) Int. Cl.
*D21C 11/00* (2006.01)
(52) U.S. Cl. .................. 162/29; 162/30.1; 162/189; 34/60; 210/710
(58) Field of Classification Search .............. 162/29, 162/30.1, 189, 381; 34/60–65, 380; 210/710, 210/609, 205
See application file for complete search history.

(56) References Cited

U.S. PATENT DOCUMENTS

| | | | |
|---|---|---|---|
| 4,592,804 A | 6/1986 | Noréus et al. | |
| 4,635,379 A | 1/1987 | Kroneld | |
| 4,746,404 A | 5/1988 | Laakso | |
| 4,756,092 A | 7/1988 | Anderson et al. | |
| 4,888,885 A | 12/1989 | Caughey | |
| 5,562,832 A | 10/1996 | McOnie et al. | |
| 6,163,981 A | 12/2000 | Nilsson | |

FOREIGN PATENT DOCUMENTS

| | | |
|---|---|---|
| EP | 0549861 A2 | 7/1993 |
| EP | 0549861 A3 | 7/1993 |
| WO | 96/21624 A1 | 7/1996 |
| WO | 2005/106113 A1 | 11/2005 |

OTHER PUBLICATIONS

International Preliminary Report on Patentability issued in PCT/FI2005/050144.
Search Report issued in priority application FI 20055037.
Patent Abstracts of Japan, english abstract of JP 2003138283.
Patent Abstracts of Japan, English abstract of JP 09060849.

*Primary Examiner*—Mark Halpern
(74) *Attorney, Agent, or Firm*—Stiennon & Stiennon

(57) ABSTRACT

Method and apparatus for reducing the amount of sludges produced in a pulp and/or paper mill. The sludge produced in a pulp and/or paper mill as a result of waste water treatment is conveyed to solid fuel and the produced fuel-sludge mixture is burned in a power boiler. The solid fuel is heated before sludge is mixed therein.

12 Claims, 2 Drawing Sheets

METHOD AND APPARATUS FOR REDUCING THE AMOUNT OF SLUDGE PRODUCED IN A PULP AND/OR PAPER MILL

CROSS REFERENCES TO RELATED APPLICATIONS

This application is a national stage application of International App. No. PCT/FI2005/050144, filed May 3, 2005, the disclosure of which is incorporated by reference herein, and claims priority on Finnish App. No. 20040637, filed May 5, 2004; Finnish App. No. 20045423, filed Nov. 5, 2004; and Finnish App. No. 20055037, filed Jan. 26, 2005, the disclosures of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method and an apparatus for reducing the amount of sludges produced in a pulp and/or paper mill.

In pulp and paper mills different kinds of sludges and waste waters are produced in various process stages in connection with the manufacture of the end product. These include for example waste waters produced in the wood room and in chipping, waste waters produced in pulping, in cleaning processes of the produced pulp and in other treatments, as well as sludges and waste waters produced in connection with papermaking. At present, the aim is to recover as large an amount as possible of the fibers that have ended up in these sludges and waste waters and to recycle the fibers back to the process, such as papermaking. The remaining sludges and waste waters that contain for instance some amount of fibers, other lignin- and wood-containing particles, whitening chemical residues, coating agent particles used for coating and other waste waters are conveyed to waste water treatment.

In the treatment of waste water, sludges and waste waters are first treated in a chemi-mechanical preliminary sedimentation plant, in which so-called primary sludge is produced. Thereafter they are treated in biological waste water purification, which produces biosludge. After these treatments the remaining waste water can be discharged to a sewage network or conveyed back to the mill as process water.

The consistency of the primary sludge obtained from the mechanical preliminary sedimentation plant is typically 1 to 3%. The consistency of the biosludge obtained from an activated sludge plant and treated by a gravitation condenser is typically 2 to 3%. In order to be able to utilize these sludges or to dispose of them, water must be removed from them because their dry matter content is too low so that they could be treated as such. Typically mechanical water separators, such as band filter presses, clamps, and different kinds of centrifuges are used for this. By means of these the consistency of the sludge can be increased to 20 to 40%. Such sludge can already be conveyed to disposal or end use. Methods that are used quite frequently include for example taking the sludge to a waste disposal site, or composting the sludge. The sludge can also be dried and conveyed to soil improvement or it can be burned in a power boiler or waste heat boiler of the mill.

In the process of burning sludge, the sludge can be conveyed directly to the furnace of a power boiler, to be burned in addition to the fuel normally burned therein, such as bark, wood chips, sawdust or peat. The sludge can also be conveyed to be burned in the recovery boiler of the mill. In these waste disposal methods problems are still caused by the high moisture content of the sludge that impairs the efficiency of the boiler. The burning of sludge in the recovery boiler also requires a great deal of accuracy, because the large variations in the dry matter content of the sludge may cause a smelt explosion hazard.

It is also possible to dry the sludge thermally in a separate sludge drying device into dry matter content of 80 to 90%, and convey it as such to be burned. Thus, as thermal drying devices it is possible to use devices in which the sludge is brought in direct or indirect contact with hot air or gas having the temperature of over 100° C. One example of a drying device suitable for indirect drying of sludge is a rotary drier. This method requires that there is available in the mill a sufficiently large amount of primary gases i.e. hot air or gases with a sufficiently high temperature, necessary for drying the sludge.

One most frequently used method for disposing of the sludge is to burn it in such a manner that the sludge is mixed with the solid fuel used in the boiler, such as bark or wood chips, before the bark or wood chips are conveyed to the furnace. It is also possible to dry the mixture of sludge and bark or wood chips further before the mixture is conveyed to burning, as disclosed in the WO patent publication 96/21624.

The above-mentioned methods for reducing the amount of sludges produced in pulp and/or paper mills by burning them mixed into the fuel of the power boiler do work as such and reduce the amount of sludges of the mill to be taken to the waste disposal site. As was mentioned above, problems are caused by the water contained in the sludge, which impairs the efficiency of the power boiler burning the sludge. Tightening environmental requirements that pose restrictions for the amount of sludge to be placed in the waste disposal site result in that it is necessary to dispose of a larger amount of waste by means of other methods.

SUMMARY OF THE INVENTION

In this description the term waste water refers to the fiber and/or particle-containing sludges and waste waters produced in different process stages in connection with the manufacture of the end product in pulp and paper mills.

Thus, the purpose of the present invention is to produce a method for reducing the amount of sludges produced in a pulp and/or paper mill, said method avoiding said problems and enabling the disposal of sludges produced in the pulp and paper mill as a result of treating waste waters in such a manner that a larger amount of sludge than before can be disposed of by means of burning. Furthermore, the processing load of the waste water plants of the aforementioned mills can be reduced at the same time. Furthermore, it is an aim of the invention to provide an apparatus implementing the aforementioned method.

The invention is based on the idea that waste waters produced in the different process stages of a pulp and paper mill are concentrated to produce a sludge having dry matter content of 20 to 25%, which sludge is conveyed to the fuel to be supplied to the power boiler of the mill and burned in the power boiler. Said power boiler can also be a waste heat boiler. The fuel of the power boiler is biofuel, such as peat, bark, wood chips or sawdust, or a mixture of at least two said fuels, which has been treated in such a manner that it is capable of absorbing sludge within itself.

The fuel is heated by means of primary or secondary heating media available in a pulp and/or paper mill into a temperature of over 100° C., whereafter the sludge, whose dry matter content is 20 to 25%, is mixed therein. The sludge, having a lower temperature cools down the hot fuel, which, while cooling down, absorbs sludge and the particles contained therein within itself. In the process of heating the fuel, primary heating media are mainly used, said media being obtained from the mill. These include hot gases obtained directly from the different steam lines or the turbine of the mill, which gases can be hot air, hot steam, such as counter-pressure steam of the turbine, steams from the power boiler or recovery boiler, or flue gases from the power boiler or recovery boiler of the mill. It is also possible to utilize secondary heating media in the heating, such as hot gases produced by means of a heat exchanger from the condensates and gases obtained from different process stages. The heating of the fuel not only results in that the fuel dries, but also in that the water inside the pieces of wood chips and bark becomes vaporized. The hot steam inside the fuel particles improves their capability to absorb sludge within themselves. Thereafter, the fuel-sludge mixture is conveyed to be burned in the power boiler. The solid fuel supplied to the power boiler by means of the invention is capable of retaining more sludge than solutions of prior art. Thus, it is possible to dispose of a larger amount of sludge by burning and the amount of sludge to be disposed of by taking it to a waste disposal site or in other ways is reduced. Furthermore, the processing load of the waste water plant of the mill is reduced. Furthermore, it brings about positive economical effects by reducing the operating costs of the mill through reduced waste water costs. By means of the method according to the invention it is also possible to improve the heat economy of paper mills by using the different hot secondary heating media produced in different unit processes to heat and dry the fuels.

According to an embodiment of the invention the fuel-sludge mixture is dried by a separate drying apparatus before conveying the fuel-sludge mixture to the power boiler. The drying apparatus is for example a direct or indirect thermal drying device that utilizes the steam or hot gases produced in other subprocesses of the plant.

In the following, the invention will be described in more detail with reference to the appended drawings.

DESCRIPTION OF THE PREFERRED EMBODIMENTS

Figure 1:
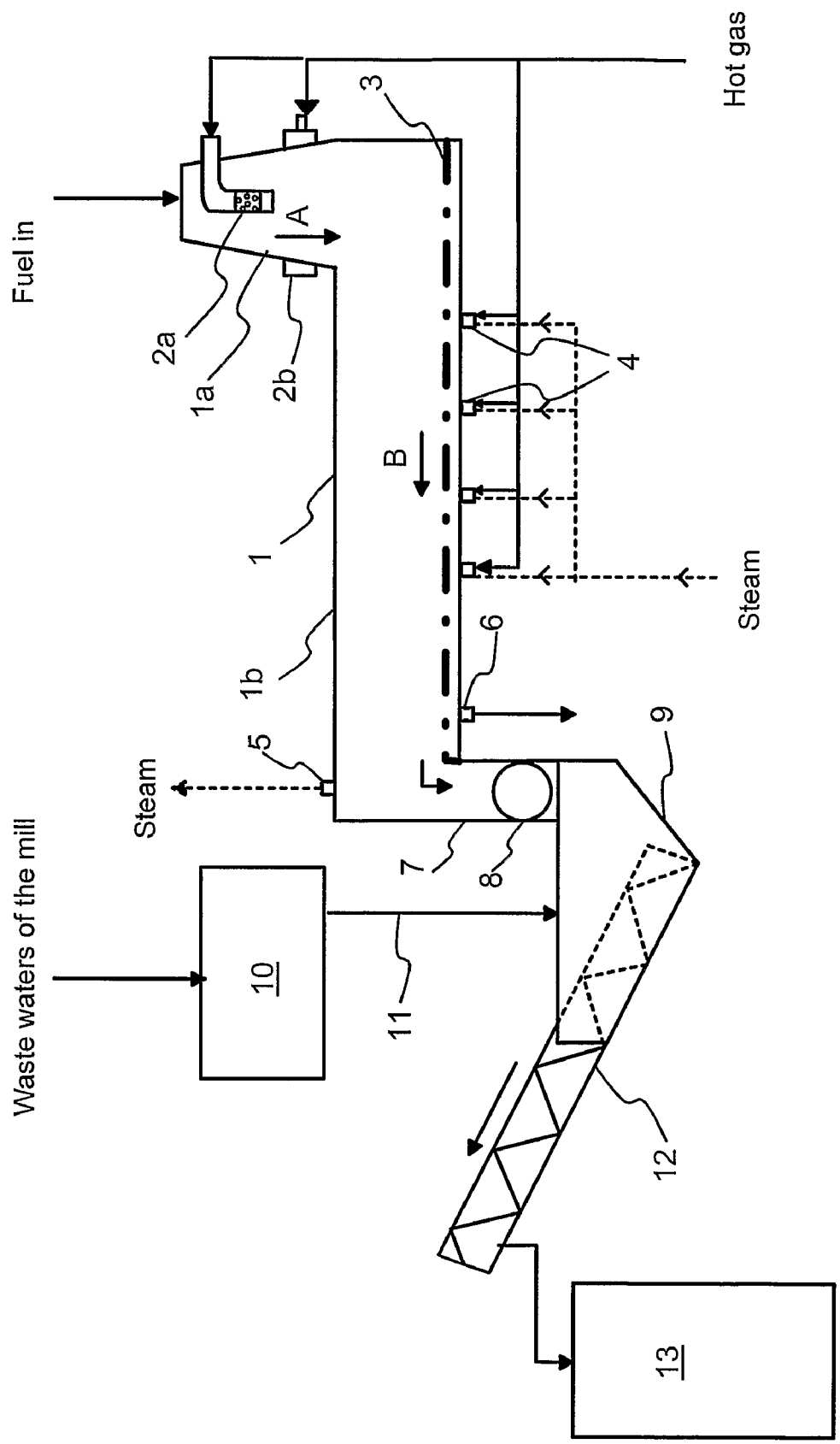
FIG. 1 shows, in a schematic side view, an apparatus according to the invention for reducing the amount of sludge.

FIG. 1 shows schematically an apparatus according to the invention for reducing the amount of sludges in a pulp or paper mill. The apparatus comprises heating means 1 for solid fuel, i.e. a steaming apparatus in which the fuel is heated and moisture is removed therefrom by means of hot gas obtained from the pulp or paper mill.

The fuel is supplied to the steaming apparatus 1 from the fuel storage bin, or if the fuel consists of wood chips, directly from chipping (not shown in the drawing). In the embodiment shown in FIG. 1, the heating of the fuel takes place in two stages. In the first fuel heating phase the wood chips are conveyed to a vertical first heating part 1a of the steaming apparatus 1 from its upper end. The fuel moves in the first heating part by means of gravity vertically downward according to the arrow A. Hot gas is conveyed to the first heating part 1a crosswisely with respect to the fuel flow from gas feeding pipes 2a and 2b. The feeding pipes are equipped with gas distribution means, for example screens to distribute the gas evenly to the fuel flow in its cross-direction. Thus, it is possible to ensure as efficient heating of the fuel as possible. In the first heating part 1a the fuel flow becomes dense and it is discharged to the second heating part 1b located in connection with the first heating part, thus forming a dense bed on top of the horizontal conveyor 3 arranged at the bottom of the second heating part 1b. The second heating part constitutes the second heating phase of the heating process. In the second heating part 1b the speed of the conveyor is arranged in such a manner that sufficient delay is ensured for the fuel so that the heating of the fuel would be as complete as possible. In the second heating part 1b the fuel bed is conveyed substantially on the horizontal plane as shown by the arrow B through the second heating part 1b by means of the conveyor 3 located below the fuel bed. Hot gas is conveyed to the second heating part 1b via nozzles 4 arranged at the bottom of the second heating phase 1b. The hot gas penetrates to the fuel bed via holes arranged in the conveyor 3.

The steam produced in the steaming apparatus is removed from the steaming apparatus 1 via a duct 5 arranged on the top of the second heating part 1b. If desired, the steam can be returned to the steaming apparatus into heating gas by conveying it directly to the second heating part 1b via the ducts 4. This is illustrated by means of broken line arrows in FIG. 1. The amount of heat contained in the steam can also be recovered in a heat exchanger (not shown in the drawing), and the thus obtained hot gas can be returned as heating gas to the steaming apparatus. The condensate produced in the steaming apparatus is removed via a condensate removing duct 6 arranged at the bottom of the second heating part 1b.

The fuel processed in the steaming apparatus whose temperature has reached a temperature of over 100° C. is discharged from the apparatus via a duct 7 integrated into the second heating phase 1b. The lower end of the duct 7 is provided with conveying means 8, such as a screw that discharges the fuel. The screw 8 discharges the hot fuel heated in the steaming apparatus 1 directly to the absorption tank 9 for sludge.

The sludge produced in the waste water treatment plant 10 is guided to the absorption tank 9 via the line 11, the dry matter content of said sludge being 20 to 25%. The waste waters produced in the different process stages of the pulp and/or papermaking process are treated in the waste water treatment plant 10. The waste waters may consist of waste water or sludge collected at different process stages, or they can consist of waste water or sludge collected at a particular process stage. They can also consist of a mixture of primary sludge and biosludge. The essential aspect is that before the waste waters are conveyed to the absorption tank 9, they are treated, in other words water is removed from them so that the dry matter content of the sludge conveyed to the absorption tank is 20 to 25%. In the process of dewatering the waste water it is possible to use for example mechanical water separators.

The sludge being in lower temperature in the absorption tank 9 cools down the hot fuel, which, while cooling down, absorbs sludge and the particles contained therein within itself. The absorption tank may also be equipped with a mixer. The fuel that has absorbed sludge, in other words the fuel-sludge mixture is removed from the absorption tank by means of a transfer means 12 connected thereto, such as a screw conveyor. Thereafter the fuel-sludge mixture is conveyed to be burned in the power boiler 13 of the pulp and/or paper mill.

If the moisture content of the fuel-sludge mixture is too high to be conveyed to the boiler to be burned, it is possible to dry the fuel-sludge mixture further in a separate drying device. One such alternative is shown in F. 2. The hot fuel obtained from the steaming apparatus (not shown in the drawing) is conveyed to the sludge absorption tank 9 via the duct 7, as disclosed in the embodiment described hereinabove. The produced fuel-sludge mixture is conveyed from the absorption tank 9 to the drier 14 via the transfer means 12, such as a screw conveyor.

Figure 2:
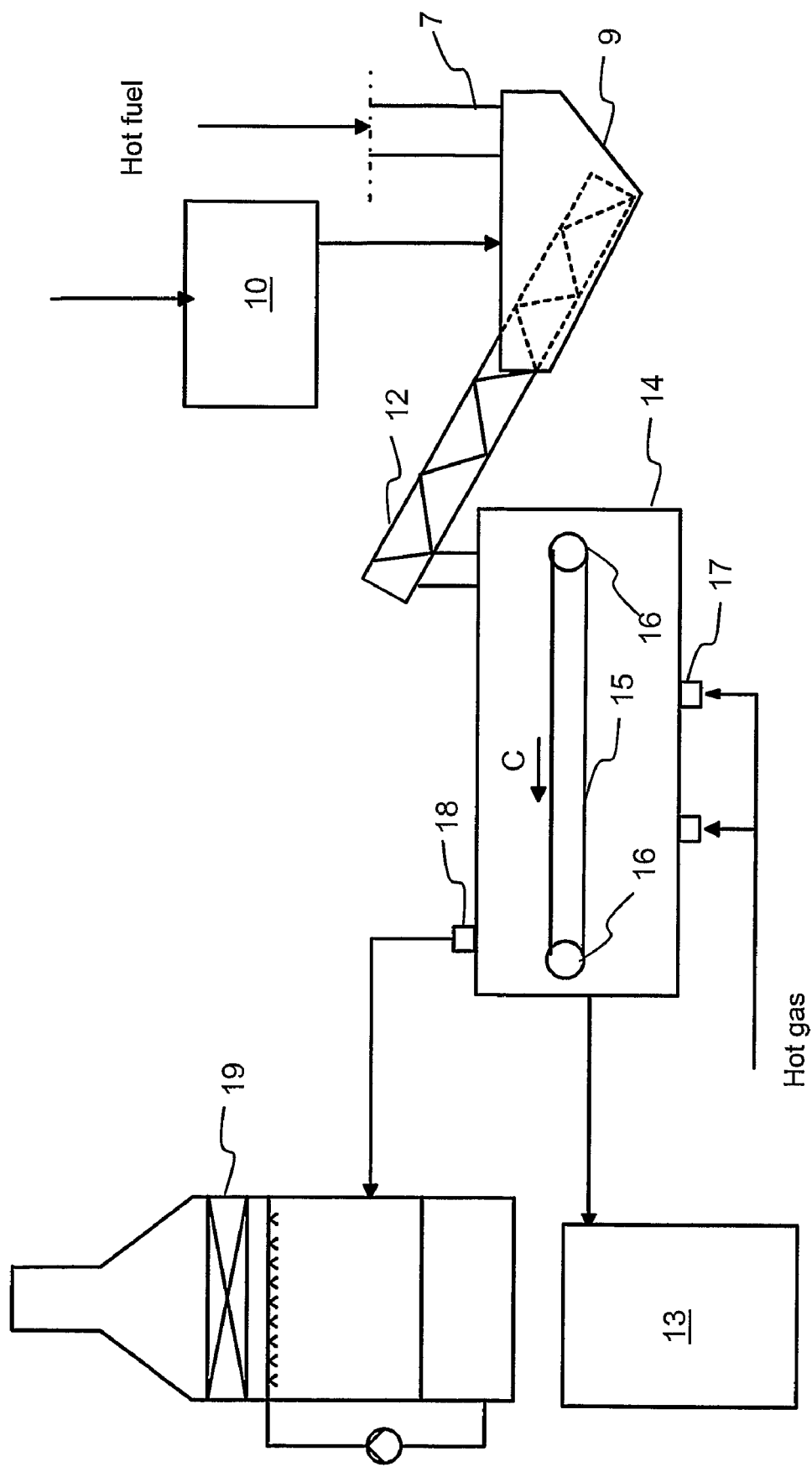
FIG. 2 shows a schematic side view of an apparatus for drying a mixture of fuel and sludge.

The drier 14 that is arranged to dry the fuel-sludge mixture, can be any drier suitable for drying solid fuel. In the embodiment of FIG. 2 the drier 14 is a belt drier in which the fuel-sludge mixture is supplied on top of a belt 15 formed by an endless loop. The belt moves by means of two rolls 16 arranged inside the loop in a stationary position to the direction shown by means of arrow C in the figure in such a manner that the dried fuel-sludge mixture is discharged from the other end of the belt. The belt 15 is provided with holes through which the hot gas conveyed to the bottom of the drier 14 via ducts 17 is capable of flowing to the fuel-sludge mixture moving on top of the belt 15 and by means of the same. The hot gas used in the drying can be primary or secondary hot gas obtained from the mill. The dried fuel-sludge mixture is conveyed from the drier 14 to the power boiler 13 to be burned. Thus, the fuel-sludge mixture dries under the influence of hot gas. The gaseous steam produced in the drier is removed from the drier via a duct 18. Depending on the composition of the gaseous steam produced in the drier 14, it is conveyed either to a separate processing system for weak odorous gases (not shown in the Figure) in the mill, to be washed in a scrubber 19 or directly to a flue gas channel (not shown in the Figure).

The invention is not intended to be limited to the embodiments presented as examples above, but the invention is intended to be applied widely within the scope of the inventive idea as defined in the appended claims.

The invention claimed is:

1. A method for reducing the amount of sludge produced in a pulp or paper mill comprising the steps of:
   heating a solid fuel to a temperature of over 100° C.;
   conveying sludges produced in a pulp or paper mill to wastewater treatment, and removing water from said sludges to produce a sludge having a selected dry matter content;
   mixing the sludges with the solid fuel of a temperature of over 100° C., cooling the solid fuel with the sludge and causing the sludge to be absorbed within the solid fuel to form a fuel-sludge mixture; and
   burning the fuel-sludge mixture in a power boiler or in a waste heat boiler.

2. The method of claim 1 wherein the solid fuel is selected from the group consisting of: peat, bark, wood chips, sawdust, and a mixture of at least two of the aforementioned solid fuels.

3. The method of claim 1 wherein the step of heating the solid fuel to a temperature over 100° C. is accomplished with hot gas.

4. The method of claim 3 wherein the hot gas used for heating the solid fuel is selected from the group consisting of hot air, hot steam, and flue gases.

5. The method of claim 1 wherein the solid fuel is heated in two phases in a solid fuel heating apparatus, and further comprising the steps of:
   flowing the solid fuel downwardly while flowing hot gas in a cross-direction with respect to the downwardly flowing solid fuel in a first phase; and
   conveying the solid fuel in a horizontal direction while flowing hot gases which pass upwardly through the solid fuel from below.

6. The method of claim 1 wherein the step of removing water from said sludges comprises removing water from the sludges to produce a dry matter content of approximately 20% to 25%.

7. The method of claim 1 further comprising the step of drying the fuel-sludge mixture prior to burning the fuel-sludge mixture in the power boiler or waste heat boiler.

8. A method for combusting sludge produced in a pulp or paper mill comprising the steps of:
   conveying sludges produced in a pulp or paper mill to wastewater treatment, and removing water from said sludges to produce a sludge having a dry matter content of 20 to 25%;
   heating a solid fuel to a temperature of over 100° C., followed by cooling said solid fuel by mixing with the sludge, so that the cooling action causes the sludge, including particles contained therein, to be absorbed within the solid fuel, to form a fuel-sludge mixture; and
   burning the fuel-sludge mixture in a power boiler or waste heat boiler.

9. The method of claim 8 further comprising the step of drying the fuel-sludge mixture before burning the fuel-sludge mixture in the power boiler.

10. The method of claim 8 wherein the solid fuel is selected from the group consisting of: peat, bark, wood chips, sawdust, and a mixture of at least two of the aforementioned solid fuels.

11. The method of claim 8 wherein the solid fuel is heated in two phases in a solid fuel heating apparatus, and further comprising the steps of:
   flowing the solid fuel downwardly while flowing hot gas in a cross-direction with respect to the downwardly flowing solid fuel in a first phase; and
   conveying the solid fuel in a horizontal direction while flowing hot gases which pass upwardly through the solid fuel from below.

12. The method of claim 8 further comprising the step of drying the fuel-sludge mixture prior to burning the fuel-sludge mixture in the power boiler or waste heat boiler.

* * * * *